United States Patent
Kennedy, Jr.

[11] 3,787,183
[45] Jan. 22, 1974

[54] METHOD OF ANALYZING CATALYST ACTION

[75] Inventor: Alvin B. Kennedy, Jr., Alvin, Tex.

[73] Assignee: Catalyst Services, Inc., Alvin, Tex.

[22] Filed: Feb. 9, 1972

[21] Appl. No.: 224,733

[52] U.S. Cl............ 23/230 R, 23/288 F, 73/421 R, 73/432

[51] Int. Cl....... B01j 9/04, G01n 1/00, G01n 31/10

[58] Field of Search...23/230 R, 288 F, 288 R, 288 S, 23/288 K, 289; 73/421 R, 421 B, 432

[56] References Cited
UNITED STATES PATENTS 3,254,966 6/1966 Bloch et al. ...................... 23/288 F
3,487,695 1/1970 Haunschild et al. ............... 23/230 R

OTHER PUBLICATIONS

Liederman et al., Anal. Chem. 30, 1543–1546, (1958).

Primary Examiner—Robert M. Reese
Attorney, Agent, or Firm—Bertram H. Mann et al.

[57] ABSTRACT

Small samples of catalyst are individually segregated in durable perforate containers located at known positions within the main body of catalyst. After a suitable period of time the samples are individually analyzed to determine the effect thereon of the process.

8 Claims, 6 Drawing Figures

PATENTED JAN 22 1974 3,787,183

METHOD OF ANALYZING CATALYST ACTION

FIELD OF THE INVENTION

The invention relates to chemical processes involving catalysts and consists particularly in novel means for determining the action and effect upon the catalyst of a chemical process.

BACKGROUND OF THE INVENTION

Various chemical processes such as hydrotreating, hydrocracking, and isomerization and manufacture of various products such as ammonia, styrene, etc., require the use in a reactor of catalysts, usually in particulate form, through which process fluids pass. From the standpoint of both the users of the catalysts and the catalyst manufacturers, it would be desirable to know what is taking place within the catalyst-occupied region of the reactor during performance of the process. While the catalyst ultimately is recovered and regenerated and/or replaced with fresh catalyst, it is not possible, of course, to know the location in the reactor of any particular sample of the catalyst, so that, if there is a variable defect noted, it heretofore has not been possible to extend the analysis to particular parts of the reactor.

Accordingly, it is an object of the present invention to provide means for accurately determining in which part of a reactor a particular sample of the catalyst or other substance was located so that the action within the reactor may be better determined.

A more specific object is to maintain identifiable samples of catalyst or other substance utilized in a chemical process in segregated condition and then individually to analyze the segregated samples for better determining the action within the reactor.

SUMMARY OF THE INVENTION

These objects are achieved substantially by segregating one or more small quantities of the catalyst in perforate durable containers and positioning these containers with samples at known locations within the main body of the catalyst where they remain during performance of the process. Ultimately, these samples are recovered, with or without the main body of the catalyst, and are individually analyzed.

DESCRIPTION OF THE PREFERRED EMBODIMENT

Figure 1:
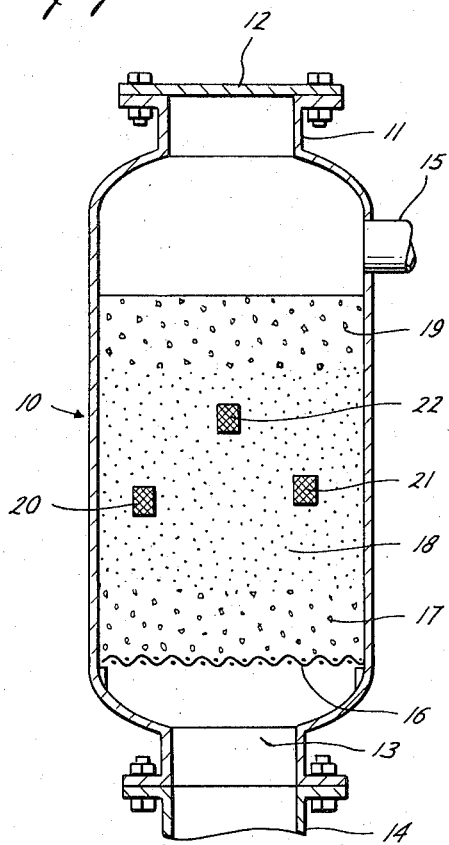
FIG. 1 is a longitudinal cross section through a reactor vessel containing segregated catalyst samples in accordance with the invention.

FIG. 1 illustrates a reactor vessel 10 having a neck 11 at the top forming a catalyst-charging opening and normally closed by a cover 12 bolted in position. At the bottom of the vessel is a second neck 13 constituting a process fluid discharge at the lower end of which there is a pipe or valve body 14. A supply pipe 15 opens into the upper part of the vessel for admitting process fluid thereto. This vessel design is merely illustrative and may be modified as desired.

Extending across the lower part of the vessel is a partition screen 16 adequately reinforced on which is supported a bed 17 of inert material, an intermediate bed 18 of catalyst in particulate form, and an upper bed 19 also of inert material. This arrangement of beds, also, is merely illustrative and any desired materials may be utilized within the scope of the present invention. Interspersed within catalyst bed 18 are a plurality of small, durable perforate containers 20, 21, and 22 each containing a small segregated quantity of the catalyst located at a known position with respect to the wall of the vessel and any other orienting point or points, such as tray 16.

Figure 2:
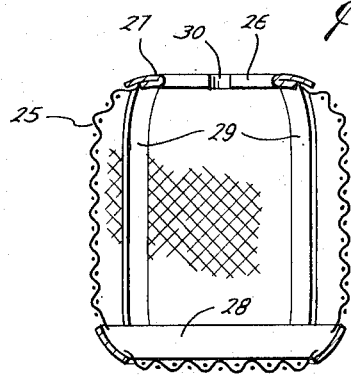
FIG. 2 is an enlarged cross section illustrating one form of perforate sample container.
Figure 3:
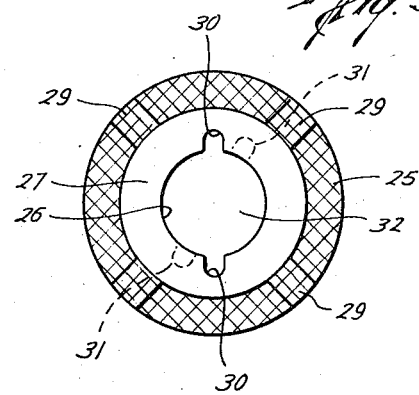
FIG. 3 is a top view of the container of FIG. 2.

An exemplary form of sample container is shown in FIGS. 2 and 3. The container is of modified cylindrical form and its wall 25 is formed substantially entirely of screen wire. At the top of the container a filling opening 26 is formed by a collar 27 secured to the upper edge of the screen. A hoop strip 28 extends around the bottom portion of the container and longitudinal, bowed reinforcement strips 29 extend along the container wall between bottom and top reinforcements 28 and 27. As shown in FIG. 3, top opening 26 is provided with diametrically opposed recesses 30 for receiving lugs 31 projecting diammetrically from a cover plate 32. After the lugs 31 are inserted through recesses 30, the cover plate may be turned slightly so that it will be retained in position. The cover plate may be supported on the sample charge or by lips (not shown) overlying collar 27.

Figure 4:
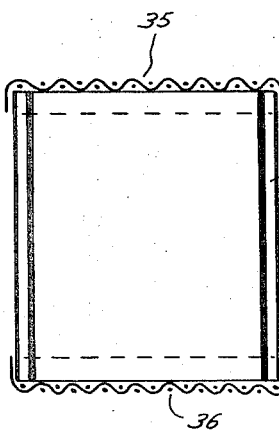
FIG. 4 is a longitudinal cross section illustrating another form of sample container.
Figure 5:
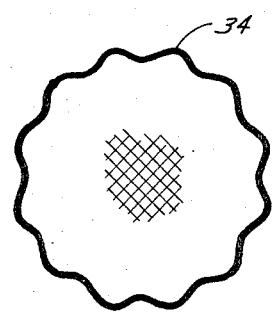
FIG. 5 is a transverse section through the container of FIG. 4.

FIGS. 4 and 5 show a slightly modified form of sample container including a generally cylindrical side wall 34, shown as of corrugated metal, and top and bottom screens 35 and 36, either or both of which is removable for introduction of the sample into the container or removal of the same therefrom.

Figure 6:
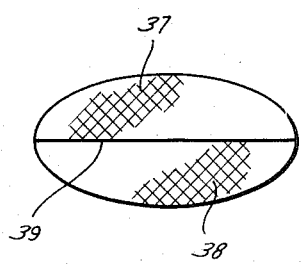
FIG. 6 is a side view illustrating still another form of sample container.

The container in FIG. 6 is of general hollow, bulbous disk form with top and bottom sections 37 and 38, both mainly of screen wire with suitable reinforcement, which join at the center line 39.

The sample containers for use in processes such as those mentioned above are quite small, containing sufficient space for only about one pint of sample. While the material of which the containers are constructed must be durable in use, it may be rigidly reinforced or may be yielding and pliable.

Operation

In charging vessel as shown in FIG. 1 with catalyst, a workman normally will be placed within the catalyst to insure proper disposition and distribution of the various beds. At the same time, he will place the sample containers, as 20, 21, and 22, and gauge carefully their locations with respect to orienting points, such as the vessel side wall and tray 16. Each container, of course, will bear a distinctive mark, and a record will be kept of the location of each container within the reactor vessel. After completion of the charging operation, the chemical process will be started and will be run for the desired period of time. When it is desired to remove the catalyst for regeneration and/or replacement, pipe or valve body 14 and screen shelf 16 will be removed to permit material beds 17, 18, and 19 to drop into suitable collectors. The segregated sample containers will be recovered and the contents thereof individually analyzed to provide accurate information as to what has happened within the reactor vessel during the performance of the process. Conceivably, the sample containers may be individually withdrawn from the main catalyst bed without removal of the latter.

The invention may be modified as indicated and in other respects as will occur to those skilled in the art, and the exclusive use of all modifications as come within the scope of the appended claims is contemplated.

I claim:

1. The method of determining the effect on a substance of a chemical process involving the substance comprising placing a sample of the substance in a perforate recoverable container, utilizing the container and sample in performance of the process, recovering the container from the process residue, and examining the contents of the container.

2. The method described in claim 1 in which said substance is a catalyst and said container is constructed of a material substantially unaffected by exposure to the process.

3. The method described in claim 2 in which said container with sample is intermingled with a larger body of catalyst utilized in the process.

4. The method described in claim 3 in which said process is at least in part performed in a reactor vessel having filling and discharge openings through which the catalyst and said container with sample are introduced into and withdrawn from said vessel.

5. The method described in claim 4 in which the wall of said container is constructed substantially of screen wire for permitting free access of process fluid to said sample.

6. The method described in claim 4 in which said container is provided with a filling and discharge opening means and cover means therefore for maintaining the sample segregated during performance of the process.

7. The method described in claim 4 including the step of gauging the positioning of the container and sample with respect to the reactor vessel.

8. The method of determining the effect of a chemical process upon a catalyst used in the process which consists in placing a plurality of samples of the catalyst in perforate containers, charging a reactor vessel with the catalyst, placing said containers with samples at known positions within the space in the vessel occupied by the catalyst, individually recovering the containers with samples after performance of the process, and analyzing the recovered samples.

* * * * *